Figure 1:
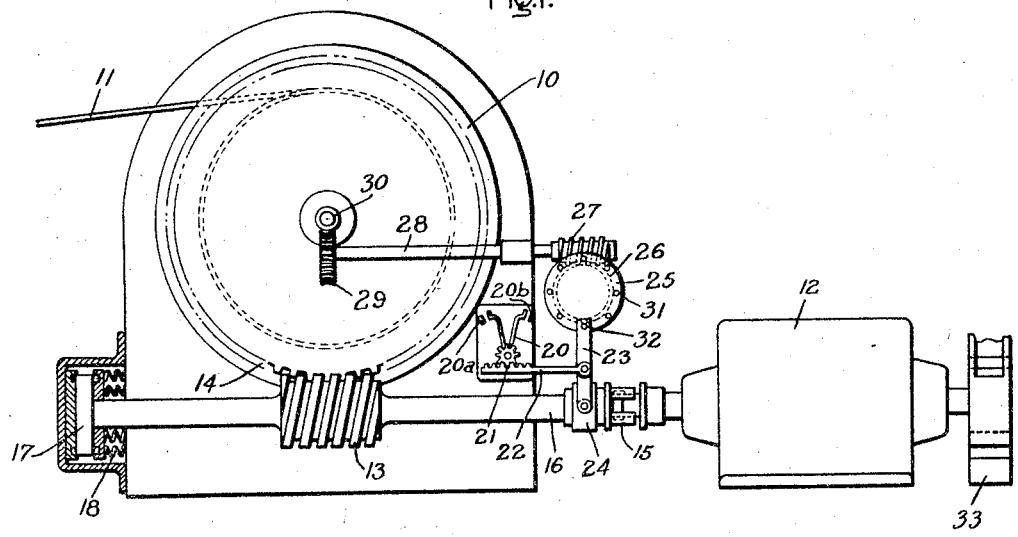

June 24, 1930.   R. H. ROGERS   1,768,420

APPARATUS FOR TOWING, MOORING, AND THE LIKE

Original Filed March 17, 1923

Inventor:
Robert H. Rogers,
by *Alexander S. [Smith]*
His Attorney.

Patented June 24, 1930

1,768,420

UNITED STATES PATENT OFFICE

ROBERT H. ROGERS, OF ALPLAUS, NEW YORK, ASSIGNOR TO GENERAL ELECTRIC COMPANY, A CORPORATION OF NEW YORK

APPARATUS FOR TOWING, MOORING, AND THE LIKE

Original application filed March 17, 1923, Serial No. 625,895. Divided and this application filed October 15, 1924. Serial No. 743,836.

My invention relates to apparatus for towing, mooring and the like and has for its object the provision of simple, reliable and efficient apparatus of this character and in which an electric motor may be used as the driving means. This application is a division of my prior application, Serial No. 625,895, filed March 17, 1923.

More specifically my invention relates to apparatus associated with the towing or mooring cable for the purpose of taking in and giving out cable so as to prevent excessive strains on the cable. Such apparatus is especially needful, for example, in rough seas to prevent the cable from being broken due to the sudden movements of the vessel or vessels to which it is attached. My invention also relates to automatic anchor lifting apparatus.

In a commonly suggested form of towing and mooring apparatus, a friction clutch or brake is provided which is arranged to hold the drum under normal conditions but to slip to pay out cable and relieve the tension when it becomes abnormally high. One disadvantage of such a system is that the static friction of the clutch is indeterminate, depending on the condition of the clutch, and is approximately 40% greater under the best of conditions than the slipping friction for which the clutch is adjusted. A correspondingly great tension on the cable is, therefore, required to cause the clutch to slip. When the clutch is allowed to stand for a considerable length of time without being used, as is often the case, the static friction may become many times greater than the value previously indicated. Furthermore, the slipping friction varies with the condition of the clutch. Thus in the operation of such devices the cable is subjected to relatively high peaks in tension before the clutch slips, the tension quickly falling off after the clutch starts to slip to a value which is also variable. Another disadvantage of such systems is the time lag due to the inertia of the parts. Since the cable tension builds up very quickly, each surge seldom lasting over three seconds, the delay in paying out cable incident to the inertia of the aparatus also results in increased cable tension. This is particularly true when the cable in paying out carries with it the entire driving mechanism and motor. With such devices, therefore, the cable tension varies over a comparatively wide and interminate range requiring the cable and other parts of the apparatus to be of great strength.

In carrying out my invention, I provide control means for the electric driving motor whereby the motor is caused to positively pay out cable upon the occurrence of a predetermined maximum tension together with auxiliary means for causing the tension necessary to cause the cable to be paid out to be gradually increased as the cable is paid out. The action of the motor in paying out cable is practically instantaneous, whereby an increase in tension is relieved at its inception so that excessively high peaks are avoided. In one form of my invention I provide an electromagnetic brake for the motor which is controlled simultaneously with the motor so as to be applied to lock the motor when it is deenergized and released to permit the motor to operate freely in either direction to pay out or wind up cable.

Figure 2:
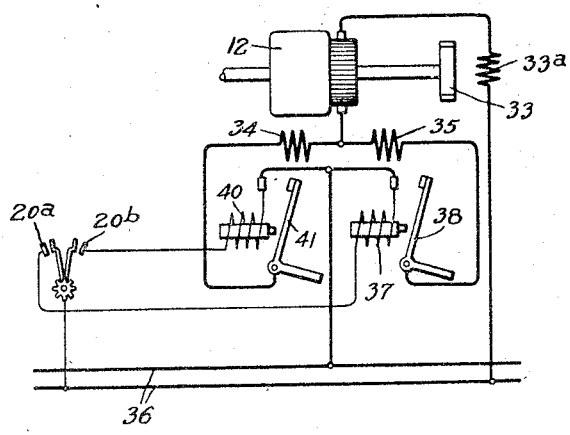
Figure 3:
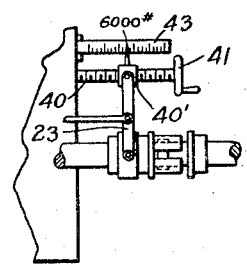

For a better understanding of my invention reference should be had to the accompanying drawing in which Fig. 1 is a fragmentary elevation view of towing apparatus embodying my invention. Fig. 2 is a diagrammatic view showing the control system for the electric motor, and Fig. 3 is a view showing details of my invention adapted to mooring.

Referring to Fig. 1 of the drawing, the towing apparatus in one form of my invention comprises a drum 10 on which the towing cable 11 may be wound up which is operated by means of an electric driving motor 12, preferably of the series type. The electric motor is operatively connected to the drum by means of a worm 13 in axial alignment with the shaft of the motor and cooperating with a worm gear 14 secured to the drum. A connection or coupling 15 permitting relative movement in an axial direction of the connected parts is provided between the shaft 16 of the worm 13 and the electric motor. Cooperating with the left hand end of the shaft 16 is a suitable thrust bearing 17 which is provided on its right hand side with springs 18 which are of sufficient strength to counteract under normal conditions the end thrust toward the right on shaft 16 which arises, it will be observed, from the tension on cable 11. In case the end thrust becomes great enough, due to excessive strains on the cable, to compress the springs 18, then the shaft 16 will be given a limited movement in an axial direction independently of motor 12 which movement is permitted by coupling 15.

The starting, stopping and direction of rotation of the motor is controlled by means of a switch arm 20 which is in the form of two branches pivotally mounted at their junction at the lower end. Secured to arm 20 at its pivot is a spur gear 21 cooperating with which is a rack 22 by means of which the contact arm may be tilted into engagement with one or the other of oppositely disposed stationary contacts 20ª and 20ᵇ. The rack 22 is pivotally attached at its right hand end to an upright lever 23 which is pivotally mounted at its lower end on a collar 24, mounted on shaft 16 between collars so as to partake of the axial movement of the shaft but not its rotary movement. Adjacent to the upper end of the lever 23 I provide auxiliary means for increasing the tension required to cause the motor 12 to continue paying out cable as the amount paid out increases, this auxiliary means comprising a disc 25 which is driven by the drum 10 through a mechanical driving connection consisting of a worm gear 26 secured to the disc, worm 27, shaft 28, worm gear 29, and worm 30 secured to the drum. Arranged around the edge of the disc 25 are a plurality of holes 31, 8 being shown in the drawing. The upper end of lever 23 is forked and embraces a pin or peg 32 secured in one of the holes 31. As thus arranged as the plate 25 is rotated from the drum 10 through the driving mechanism previously described, the lever 23 is tilted in one direction or the other. A suitable electromagnetic brake 33 is provided for the motor. This brake is released by an operating coil 33ª (Fig. 2) which is in series with the electric motor in a well-known manner so that when the motor is operating the brake is released, while the deenergization of the motor immediately applies the brake locking the motor.

The contact arm 20 may be arranged to control the circuit of the motor 12, but preferably it is arranged in a control circuit, as shown in Fig. 2, so as to selectively control the energization of differential fields 34 and 35 for the motor and thus control the direction of rotation of the motor. When the contact arm is moved to engage stationary contact 20ª a circuit is closed from the source of supply 36 through operating coil 37 whereby contactor 38 is closed and a circuit for the motor thereby closed through the motor field 35, the armature of the motor and through operating coil 33ª of the brake 33. The motor thereupon starts up and operates in one direction as determined by the field winding 35, brake 33 having been released by the energization of coil 33ª. Upon engagement of contactor 20 with stationary contact 20ᵇ a circuit is closed through operating coil 40 whereby contactor 41 is closed and a circuit thereby closed through field coil 34 the armature of the motor, and brake operating coil 33ª. This causes the motor to operate in the opposite direction, the brake 33 being released as before. For the sake of simplicity no starting resistances for the motor are shown, while the reversing of the motor is shown as effected by differential fields. Obviously any suitable control system for the motor may be used.

As thus constructed and arranged the operation of the towing apparatus is as follows: With the various members in the relative positions shown in the drawing, the electric motor 12 will be at rest and a predetermined length of cable 11 will extend between the ship and its tow. These normal conditions will exist as long as the tension applied to the cable 11 is less than a predetermined value determined by the strength of the cable, for example, 2700 lbs. and hence is not great enough to appreciably compress the springs 18. Assuming now that due to rough seas or some abnormal condition, the tension rises to the predetermined maximum, then the springs 18 will be compressed permitting shaft 16 to move axially toward the right whereby the switch arm 20 is thrown to the left into engagement with stationary contact 20ª, through the connection afforded by lever 23 and rack 22, lever 23 turning about peg 32 as a fulcrum. This closes the circuit of the electric motor 12 and releases brake 33, whereupon the motor starts up in a direction to rotate drum 10 in a counter clockwise direction and thus pays out more cable and relieves the tension. The motor will continue to operate and pay out more cable as long as an abnormal tension is applied, although the tension necessary to cause the cable to be given out will gradually increase. This is due to the effect of the turning of disc 25 by the drum 10. For this direction of rotation of the drum (counter clockwise), the disc 25 will move in a clockwise direction carrying the upper end of lever 23 with it toward the left which moves rack 22 toward the left and tends to disengage contact 20 from stationary contact 20ª and open the circuit of the motor 12.

In order to overcome this tendency to open the motor circuit, it will be observed that a gradually increased tension must be applied to the cable so as to move shaft 16 farther and farther toward the right. In other words, the tension required to cause the cable to be given out increases gradually as it is given out.

Assuming now that the tension on the cable decreases, for example, due to the cessation of the conditions which originally caused its abnormal increase, then shaft 16 will move toward the left returning to its original position and tilting the contact arm 20 in a clockwise direction so as to disengage stationary contact $20^a$ whereby the motor circuit is broken. Due to the displacement of the upper end of lever 23 toward the left, as previously described, contact arm 20 will engage stationary contact $20^b$, however, when the shaft 16 has returned to its original position after the tension in the cable has dropped below the predetermined maximum. The electric motor 12 will thus be started in the opposite direction to wind up the cable. Disc 25 will at the same time be rotated in a counter clockwise direction back towards its original position and when it reaches this position and has thus returned lever 23 to its original upright position, contact arm 20 will be tilted to the left to midposition whereby the motor circuit is broken and brake 33 applied. It will be observed that the angular position of disc 25 depends on the angular position of the reel 10 and hence is a measure of the length of cable extending between the ship and its tow. Since the disc 25 always comes to rest in the same angular position under normal conditions, that is, with the peg 32 at its lowermost point, it will be observed that a constant length of cable will thus be maintained. As long as the strain on the cable is below the predetermined maximum value, the apparatus will remain at rest, motor 12 being deenergized and the brake 33 being applied to lock the motor and thus hold the drum from turning. The apparatus thus operates to maintain a predetermined length of cable for, although the cable is temporarily given out to relieve excessive strain thereafter upon the reoccurrence of normal conditions the cable is wound up again to the predetermined length.

The holes 31 in the disc 25 are provided to allow for adjustment of the length of cable which it is desired to maintain under normal conditions. By changing the position of the peg 32, the position in which disc 25 will come to rest can be varied since the disc always comes to rest with the peg at its lowermost point, whereby the length of cable which will be automatically maintained is regulated. In adjusting the cable to the desired length, the peg 32 may be removed and the electric motor controlled by hand by moving the upper end of lever 23 so as to adjust the cable to the desired length after which the peg 32 is placed in the lowermost aperture.

Under usual conditions of operation disc 25 will be turned through only a small angle, and the peg 32 will not be carried out of the slot in the upper end of lever 23. The open slot is provided for emergencies, such as when the towed vessel goes aground and a great length of cable must be given out, in which case disc 25 will be turned through a considerable angle and the peg will, therefore, be carried out of the slot. After the peg disengages lever 23 it will be observed that no further increase in tension is required to cause the continuous paying out of cable.

In the towing apparatus it will be observed that as long as the cable is adjusted to the predetermined length, a decrease in cable tension to any low value will not in any way affect the motor. In case the length of the cable has been increased to relieve excessive strains, however, then the adjustment of the control apparatus will be temporarily changed, by the tilting of lever 23 to the left, so that a subsequent decrease in tension will cause the motor to take up cable until the original length has been restored at which time the control apparatus will have been restored to its former adjustment. It will be thus observed that by removing the mechanical connection between lever 23 and the drum and setting the lever permanently in some position such that the motor circuit is closed to take in cable when the tension increases to a predetermined value, the cable will be maintained at an approximately constant tension, that is at a mean tension between fixed maximum and minimum limits, and the tension will be thus maintained entirely independently of the length of the cable. It will also be observed that by adjusting the position of lever 23, that is by moving its upper end to the right or left, the mean tension which will be maintained will be regulated. Such a device is particularly adapted for mooring. A convenient arrangement providing for such adjustment of the upper end of lever 23 is shown in Fig. 3.

Referring to Fig. 3, the upper end of lever 23 may be pivotally secured to a travelling nut $40^1$ mounted on a threaded shaft 40 which may be turned in either direction by means of a handwheel 41 so as to adjust the position thereon of the nut $40^1$ and hence the position of lever 23. For convenience in setting, a pointer may be provided on the travelling nut which pointer cooperates with a suitable stationary scale 43 calibrated in pounds tension on the cable.

With the exception of this change from automatic to manual control of lever 23, as shown in the fragmentary view Fig. 3, the mooring apparatus is similar to the towing apparatus shown in Fig. 1 and its operation will be understood by reference to Fig. 1.

With this arrangement, the pointer is set to indicate on scale 43 the pounds tension, for example, 6000 lbs. which it is desired to maintain on the mooring cable. The motor will now operate to take in cable, contact arm 20 (Fig. 1) having been thrown into engagement with stationary contact 20ᵇ by the setting of the pointer, until when this tension is applied to the cable, shaft 16 will be moved axially to the right against the pressure exerted by springs 18 causing contact arm 20 to move to midposition whereby the motor circuit is opened and the brake 33 applied to lock the motor and hold the drum. It will thus be observed that when contact arm 20 is in midposition, springs 18 are partially compressed, shaft 16 being midway, or approximately so, of its range of movement in an axial direction. Due to this constant tension on the cable, the ship will be brought up to the dock or buoy to which it is moored and will be normally held in this position. In case of heavy seas or other conditions causing the tension in the cable to increase to a value somewhat greater than the predetermined mean value of 6000 lbs. shaft 16 will be forced to the right until contact arm 20 engages stationary contact 20ᵃ. The motor is thus caused to operate in a direction to pay out cable and relieve the tension until stopped by the return of contact arm 20 to midposition after the mean tension has been established. When the tension again decreases to a value somewhat less than the predetermined mean, the cable will be wound up.

While I have described my invention as embodied in concrete form and as operating in a specific manner in accordance with the provisions of the Patent Statutes, it should be understood that I do not limit my invention thereto, since various modifications thereof will suggest themselves to those skilled in the art without departing from the spirit of my invention, the scope of which is set forth in the annexed claims.

What I claim as new and desire by Letters Patent of the United States, is:—

1. Apparatus for controlling the cable of a towing or mooring machine or the like, comprising a drum for winding up the cable, a motor for operating said drum, means operated responsively to the tension of the cable for controlling said motor to pay out cable upon the occurrence of a predetermined tension, and auxiliary means responsive to rotation of said drum for increasing the tension required to cause said motor to pay out cable, said auxiliary means including means for limiting the response of said auxiliary means to a predetermined movement of said drum.

2. Apparatus for controlling the cable for towing or mooring machine or the like, comprising a drum for winding up the cable, an electric motor for operating said drum, control means operated responsively to the tension of the cable for controlling the energization of said motor to pay out cable upon the occurrence of a predetermined tension, and auxiliary motor control means responsive to rotation of said drum for increasing the tension required to cause said motor to pay out cable, said auxiliary control means including means for rendering said auxiliary control means ineffective after a predetermined length of cable has been given out whereby said motor is thereafter controlled to pay out cable without further increase in tension.

3. Apparatus for controlling the cable of a towing or mooring machine or the like, comprising a drum for winding up the cable, a motor for operating said drum, means operated responsively to the tension of the cable for controlling said motor to pay out cable upon the occurrence of a predetermined tension and to wind up cable upon a subsequent decrease in tension, and a driving connection between said drum and said control means including means dependent upon the rotation of said drum for disconnecting said driving connection.

4. Apparatus for controlling the cable of a towing or mooring machine or the like, comprising a drum for winding up the cable, an electric motor for operating said drum, means operated responsively to the tension of the cable for controlling the energization of said motor to operate in one direction to pay out cable upon the occurrence of a predetermined tension and to operate in the other direction to wind up cable upon a subsequent decrease in tension, a driving connection between said drum and said control means whereby the tension required to cause said motor to pay out cable is increased as cable is given out, and means dependent upon the length of cable given out for rendering said driving connection ineffective after a predetermined length of cable has been given out and for reestablishing said connection when the cable is wound up.

5. Apparatus for controlling the cable of a towing or mooring machine or the like, comprising a drum for winding up the cable, an electric motor, a yieldable driving connection between said motor and said drum whereby said drum is movable independently of said motor in response to the tension of the cable, means operated responsively to said independent movement of the drum to control the energization of said motor to pay out cable upon the occurrence of a predetermined tension, and auxiliary control means for said motor responsive to the rotation of said drum for increasing the tension of said cable required to cause said motor to pay out cable, and means dependent upon the length of cable given out for disconnecting said auxiliary control means and subsequently upon a decrease in tension for reconnecting said auxiliary control means.

6. Apparatus for controlling the cable of a towing or mooring machine or the like, comprising a drum for winding up the cable, an electric motor, a yieldable driving connection between said motor and said drum whereby said drum is movable independently of said motor in response to the tension of the cable, switching means for starting and stopping said motor for each direction of rotation, a driving connection between said drum and said switching means whereby said motor is caused to pay out or wind up cable upon independent movement of said drum in response to changes in tension on said cable, a second driving connection between said drum and said switching means tending to move said switching means to stop said motor as cable is given out, and means for disconnecting said second driving connection after a predetermined length of cable is given out and for reestablishing said connection when cable is wound up.

In witness whereof, I have hereunto set my hand this 10th day of October, 1924.

ROBERT H. ROGERS.